United States Patent [19]
Hotier

[11] Patent Number: 6,149,874
[45] Date of Patent: Nov. 21, 2000

[54] RINSING APPARATUS IN A SIMULATED MOVING BED ADSORPTION UNIT, AND THE USE THEREOF

[75] Inventor: Gérard Hotier, Rueil Malmaison, France

[73] Assignee: Institut Francais du Petrole, Rueil-Malmaison, Cedex, France

[21] Appl. No.: 08/891,001

[22] Filed: Jul. 10, 1997

[30]    Foreign Application Priority Data

Jul. 11, 1996  [FR]  France ................................... 96 08839

[51] Int. Cl.$^7$ ...................................................... B01J 8/04
[52] U.S. Cl. ........................ 422/142; 422/140; 422/115; 210/264
[58] Field of Search ..................... 585/821, 826, 585/822, 820, 828, 827; 422/115, 114, 105, 140, 278, 142, 281; 210/659, 98, 662, 264

[56]              References Cited

U.S. PATENT DOCUMENTS 3,761,533   9/1973   Otani et al. ............................. 260/674

4,434,051   2/1984   Golem ...................................... 210/264

*Primary Examiner*—Hien Tran
*Assistant Examiner*—Susan Ohorodnik
*Attorney, Agent, or Firm*—Millen, White, Zelano and Branigan, P.C.

[57]                ABSTRACT

A rinsing apparatus used in a simulated moving bed feed adsorption unit includes a plurality of beds of an adsorbent, each being connected by a fluid distribution arrangement comprising a line for distributing fluids to at least one feed inlet. The apparatus includes at least one desorbent (or solvent) inlet, at least one outlet for an extract and at least one outlet for a raffinate. Each is characterized in that each distribution line for each bed comprises at least one rinsing valve, all of the rinsing valves being connected to a line for circulating displaced fluid. The distribution line comprises a fluid circulation pump and a regulator for the flow rate of the fluid delivered by the pump. Each of the rinsing valves is connected to a controller for controlling the opening or closing of said valves. The apparatus is used for the separation of aromatic hydrocarbons containing 8 carbon atoms, and in particular for the production of very high purity para-xylene.

5 Claims, 4 Drawing Sheets

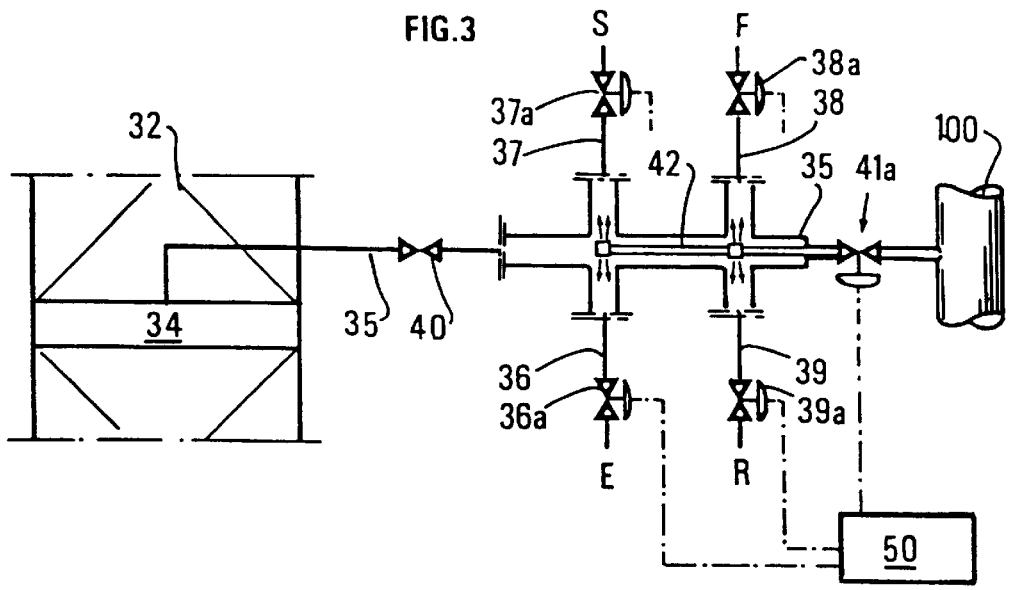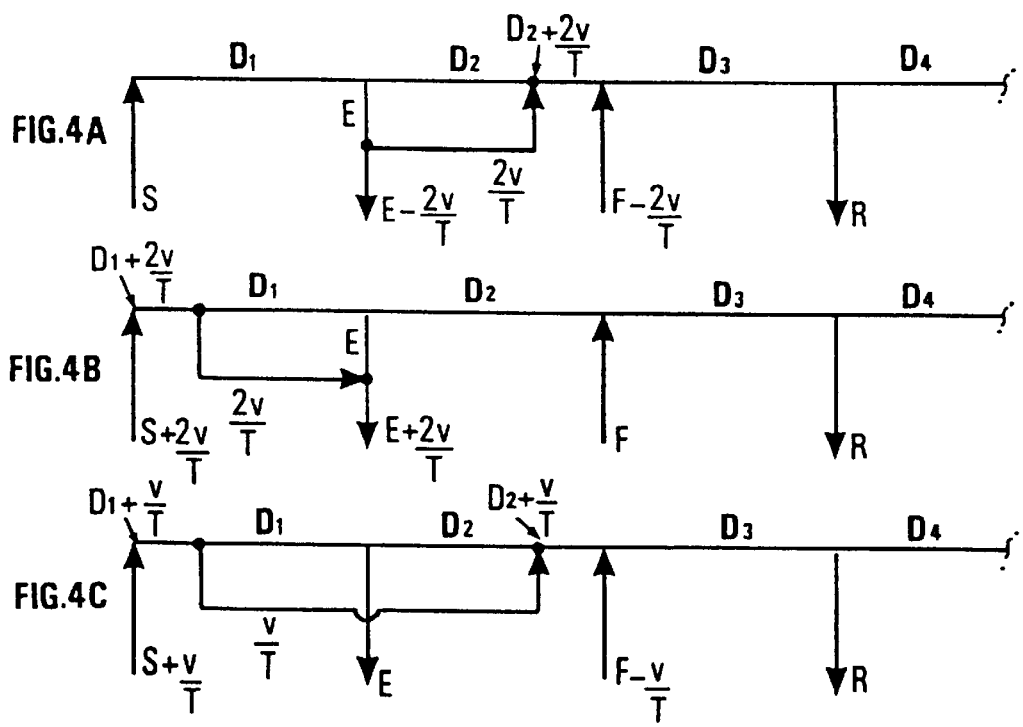

RINSING APPARATUS IN A SIMULATED MOVING BED ADSORPTION UNIT, AND THE USE THEREOF

The invention concerns a rinsing apparatus in a simulated moving bed feed adsorption unit in counter-current or co-current mode.

It is of particular application to the separation of aromatic hydrocarbons containing 8 carbon atoms, in particular for the production of very high purity para-xylene.

The prior art is illustrated by the following patents: U.S. Pat. Nos. 3,201,491, 3,268,605, and International patents WO 96/12542 and WO 95/07740.

A simulated moving bed adsorption process for separation must contain:

1) an assembly of beds of adsorbent (or fixed phase) disposed in a closed loop, the total number of beds generally being between three and twenty-four;
2) means for connecting each of such beds with the streams supplying the separation unit, such as solvent(s), feed(s) to be separated, and internal reflux;
3) means for connecting each of such beds with the streams from the separation unit, for example extract(s), raffinate(s);
4) means for connecting each of such beds with the following bed (in the direction of fluid circulation).

Depending on the particular type of apparatus, the apparatus can have either a fluid recirculating device is located between the last and first bed (pump or compressor), or a device for interrupting the stream between two successive beds (on-off valve), or a device for regulating the flow rate and/or pressure at the inlet to each bed.

Two types of apparatus are available:

1. Each bed is contained in an independent vessel and one line connects it to the following bed. In this instance, it is of advantage to connect one independent line per inlet and outlet line to the one line. The AROMAX process from TORAY Industries, a large scale process, is of this type. While the individual beds are disposed in a single column, they are separated by solid plates, and all of the fluid from each bed is collected by one line which leaves the column and returns again to supply the following bed.

More generally for small scale units, it is advantageous to isolate each bed in a particular vessel and to connect it to the subsequent bed by a line.

In this type, it is easy to use one line per stream entering or leaving each bed, avoiding any problems of contamination of one stream by another.

2. Several beds are contained in a single vessel or column and each bed is separated from the following bed by a distributor plate which must carry out four functions:
   collect together the fluid collected at the end of the bed;
   extract a portion of that fluid during certain phases of the cycle, such that the composition of the extracted portion is identical to the composition of the fluid as a whole;
   inject an external fluid into the internal fluid during certain phases of the cycle, and produce a compositionally homogeneous mixture;
   distribute the fluid to the inlet to the following bed.

In the PAREX process, a valve described in U.S. Pat. No. 2,985,589 shows how it is possible to sequentially connect at least two inlet and two outlet streams to each bed containing adsorbent.

That patent clearly shows that each of the distributors is connected via a single line to a valve which successively connects each distributor to the feed then to the extract, then to the solvent, then to the raffinate.

This type of operation has the disadvantage of considerably reducing process performance (purity and yield) since each stream is contaminated by the contents of the common line at the moment that a given stream is connected to a particular bed.

By way of illustration only, consider a column which is subdivided into twelve beds and which functions as follows:

In period n°1 of the cycle (comprising 12 periods), solvent is injected into bed n°1, extract is extracted from bed n°3, feed is injected into bed n°7 and raffinate is extracted from bed n°9. At the beginning of the second period of the cycle, the injection and extraction points are displaced by one bed and solvent is then injected into bed n°2, extract is extracted from bed n°4, feed is injected into bed n°8 and raffinate is extracted from bed n°10. The cycle continues until the twelfth period when solvent is injected into bed n°12, extract is extracted from bed n°2, feed is injected into bed n°6 and raffinate is extracted from bed n°8.

At the end of the first period, the line connecting distributor n°1 to the valve which controls the streams is thus full of solvent. At the start of the fourth period, raffinate is extracted from bed n°12, and thus from the line which has been used for injection of solvent during period 1. During the time required for evacuation of the volume of that line, solvent is extracted instead of raffinate. This results in unnecessary dilution which in the end results in over-consumption of solvent and thus an operating overcost. At the end of the fourth period, that line is full of raffinate. During the seventh period, feed is injected into bed n°1. For a certain time, raffinate is flushed into bed n°1 instead of injecting the feed. This means that the para-xylene in the feed is diluted by raffinate. Since the productivity of the unit is proportional to the concentration of para-xylene in the feed, the overall result is a drop in productivity. At the end of the seventh period, the line is full of feed. During the tenth period, extract is extracted from bed n°12. During the time required to flush the line, feed is extracted instead of extract. This results in a very high reduction in purity, since the para-xylene concentration in the feed is of the order of 20% (thus 80% of impurities). Such contamination means that it is impossible to produce high purity para-xylene. At the end of the tenth period, the line is full of extract. At the start of the first period, the solvent flushes the contents of the line into the adsorber at the start of the para-xylene desorption zone (zone 1). A portion of that para-xylene thus remains adsorbed on the fixed phase, and is subsequently partially washed out in the raffinate stream. This results in a drop in the para-xylene yield.

In summary, contamination due to the use of a common line connecting each of the four process streams to the inlet to the distributor plate increases solvent consumption, reduces productivity, greatly reduces purity and reduces the yield.

While it is known in the PAREX process to have an injection between extracting the extract and injecting the feed, the only document published on this subject concerns injection of one or two internal refluxes of extract or distilled raffinate located either between the extract and the feed, or between the feed and raffinate (U.S. Pat. No. 3,761,533). Re-injecting extract or solvent between the feed and extract only solves the problem of a large reduction in purity.

In the ELUXYL process, instead of using a single valve which carries out all the connections between the different streams and each bed, there is one on-off valve per stream and per bed.

While each of such valves is located as close to the bed it controls as possible, each distributor must be connected to one solvent valve, one extract valve, one feed valve, one raffinate valve and optionally one internal reflux valve.

The aim of the invention is to overcome the disadvantages of the prior art.

More precisely, the invention concerns a rinsing apparatus in a simulated moving bed feed adsorption unit comprising a plurality of beds (32) of an adsorbent, each being connected by a fluid distribution means (34) comprising a line (35) for distributing fluids to at least one feed inlet (38), at least one desorbent (or solvent) inlet (37), optionally at least one internal reflux inlet, at least one outlet (36) for an extract and at least one outlet (39) for a raffinate, each inlet and outlet comprising an on-off valve (36a, 37a, 38a, 39a), the apparatus being characterized in that each distribution line (35) for each bed comprises at least one rinsing valve (41a), al of the rinsing valves being connected to at least one line (100) for circulating displaced fluid, said line comprising at least one fluid circulation pump (102) and at least one means (103, 104) for controlling the flow rate of the fluid delivered by the pump, each of the rinsing valves (41a) being connected to a means for controlling the opening or closing of said valves.

The moving bed can be in simulated counter-current or simulated co-current mode. The desorbent can be a liquid phase or a supercritical, subcritical or gas phase. Under these conditions, the term "circulation pump" also encompasses a compressor.

The simulated moving bed process is described in the following patents: U.S. Pat. No. 2,985,589, U.S. Pat. No. 4,498,991, U.S. Pat. No. 5,422,007, and European patent EP-B-0 531 191, which are hereby incorporated by reference.

In a first embodiment (FIG. 1), the circulation pump can draw off the fluid contained in at least one common section of volume v for a given bed, the common section being located between the fluid distribution means, the on-off valves and the rinsing valve, and delivers it to an external collector. Conversely, the circulation pump can draw the fluid from an external collector and can deliver it to a given adsorbent bed.

In a second embodiment of the rinsing apparatus, the fluid circulation line is a closed loop (FIG. 2), each of the rinsing valves being connected to said loop, the loop comprising at least one on-off block valve (201) defining at least two sections, two on-off valves (112, 114 and 122, 124) at each of the extremities of the loop for connecting each extremity to either the intake or delivery of the circulation pump, and control means which can activate the block valve and the on-off valves at each extremity of the loop so as to orient the circulation of the fluid extracted from a section and that of the delivered fluid in another section of the loop in one direction or in another.

The closed circulation loop can comprise n block valves which define n+1 sections.

In a further variation of the second embodiment, an external fluid line is connected to the intake of the pump or compressor by an on-off valve, so as to deliver the external fluid to a given bed. The pump delivery can be connected to an external line by a further on-off valve, so as to evacuate the contents of one or more common sections to a suitable external collector.

The invention also concerns the use of a rinsing apparatus in a bed of a simulated moving bed process for separating a feed into at least one of its constituents, to rinse at least one common section with volume v located between the fluid distribution means, the on-off valves (36a, 37a, 38a and 39a) and the rinsing valve (41a).

This separation process can be applied to the separation of para-xylene from a feed of aromatic hydrocarbons containing 8 carbon atoms comprising xylenes, for the preparation of terephthalic acid or anhydride which is an intermediate in nylon synthesis, or methyl terephthalate, which is an intermediate in the synthesis of certain plastics materials.

It can also be applied to the separation of diethylbenzenes and to the separation of ethylbenzene, normal- and iso-paraffins, olefins, sugars, and more generally to the separation of mixtures of products which are suitable for adsorption or chromatography, for example the separation of optical isomers.

It can be applied to the separation of para-diethylbenzene, a good desorbent, from a mixture of diethylbenzenes.

In a first implementation of the process corresponding to the first embodiment of the apparatus (FIG. 1), the fluid contained in the common section [located between the fluid distribution means, the on-off valves (36a, 37a, 38a, 39a) and the rinsing valve (41a)] is sequentially extracted during at least a portion of a permutation period T at a flow rate v/t, v being the volume of the section and $t \leq T$. and delivered to an external collector.

The term "sequential extraction" means extraction which is synchronised with the other supply and extraction operations during at least a portion of a permutation period (the time elapsed when permutating from one bed to another).

In a second implementation of the process corresponding to the first embodiment of the apparatus (FIG. 1), the fluid is sequentially extracted from an external collector and delivered to the common section [located between the fluid distribution means, the on-off valves (36a, 37a, 38a, 39a) and the rinsing valve (41a)] during at least a portion of a permutation period T at a flow rate v/t, v being the volume of the section and $t \leq T$.

In a third implementation of the process corresponding to the first embodiment of the apparatus (FIG. 1), the fluid contained in the common section [located between the fluid distribution means, the on-off valves (36a, 37a, 38a, 39a) and the rinsing valve (41a)] corresponding to a bed in a given zone is sequentially extracted during at least a portion of a permutation period T and delivered to the external collector and during a further portion of the period, said fluid is extracted from the external collector and delivered to the common section of a bed located in another zone.

It can be of particular advantage to deliver the feed from the common section of a bed in zone 2 by means of the extract originating from an external line at a flow rate of 2 v/t where $t \leq T$ for a portion of permutation period T and to draw extract from the common section of a bed in zone 1 to deliver it to the extract extraction line during a further portion of the period.

In a first implementation of the process corresponding to the second embodiment of the apparatus (FIG. 2), the fluid contained in a common section of a bed in one section is extracted during at least a portion of a permutation period T and delivered into a bed in another section at a flow rate v/t, where $t \leq T$, the block valve (201) between the two sections being closed.

In a second implementation of the process corresponding to the second embodiment of the apparatus (FIG. 2), the fluid contained in a common section of a bed in one section is extracted during at least portion of a permutation period T and delivered to a bed in another section at a flow rate v/t, where $t \leq T$, at least one of the block valves (201, 202, 203) being closed.

In a third implementation of the process corresponding to the second embodiment of the apparatus (FIG. 2), the fluid of a common section of a bed in a first section is sequentially extracted during a portion of a period and delivered to a bed in a different section and during a further portion of the period, fluid is extracted from a common section of a bed of another section and delivered to a bed in a different section.

In a fourth implementation of the process corresponding to the second embodiment of the apparatus (FIG. 2), the fluid of a common section of a bed in one section is sequentially extracted during a portion of a period and delivered to a bed in another section and during a further portion of the period, fluid is extracted from an external source and delivered to the same bed in said section or into a different bed.

In a fifth implementation of the process corresponding to the second embodiment of the apparatus (FIG. 2), the fluid of a common section of a bed in one section is sequentially extracted during a portion of the period and delivered to a bed in another section and during a further portion of the period, fluid contained in the common section of a bed is extracted and delivered to an external source.

In general, 0.5 to 3 times the volume of the common section defined above is extracted or delivered.

BRIEF DESCRIPTION OF THE DRAWINGS

The invention will be better understood from the accompanying figures which schematically illustrate an embodiment of the apparatus and process of the invention, and in which:

FIG. 3 shows a connection in the rinsing line for each bed in the adsorption zone;

FIGS. 4a, 4b, 4c, 5a, 5b, 5c, 6a, 6b, 6c, 6d represent different rinsing operations during at least a portion of a time period relating to the different incoming streams (solvent (S), feed (F) and outgoing streams (raffmate (R) and extract (E)).

In FIG. 3, an adsorber 30 is located in one or more columns and contains an appropriate adsorbent and comprises seventeen beds 32. Each bed is connected via a distributor 34 to a line 35 which alternately receives supplies of feed 37 and solvent 38 controlled by valves 37a and 38a. Line 35 is also connected to lines for extracting an extract 36 and a raffinate 39 controlled by valves 36a and 39a respectively.

Figure 1:
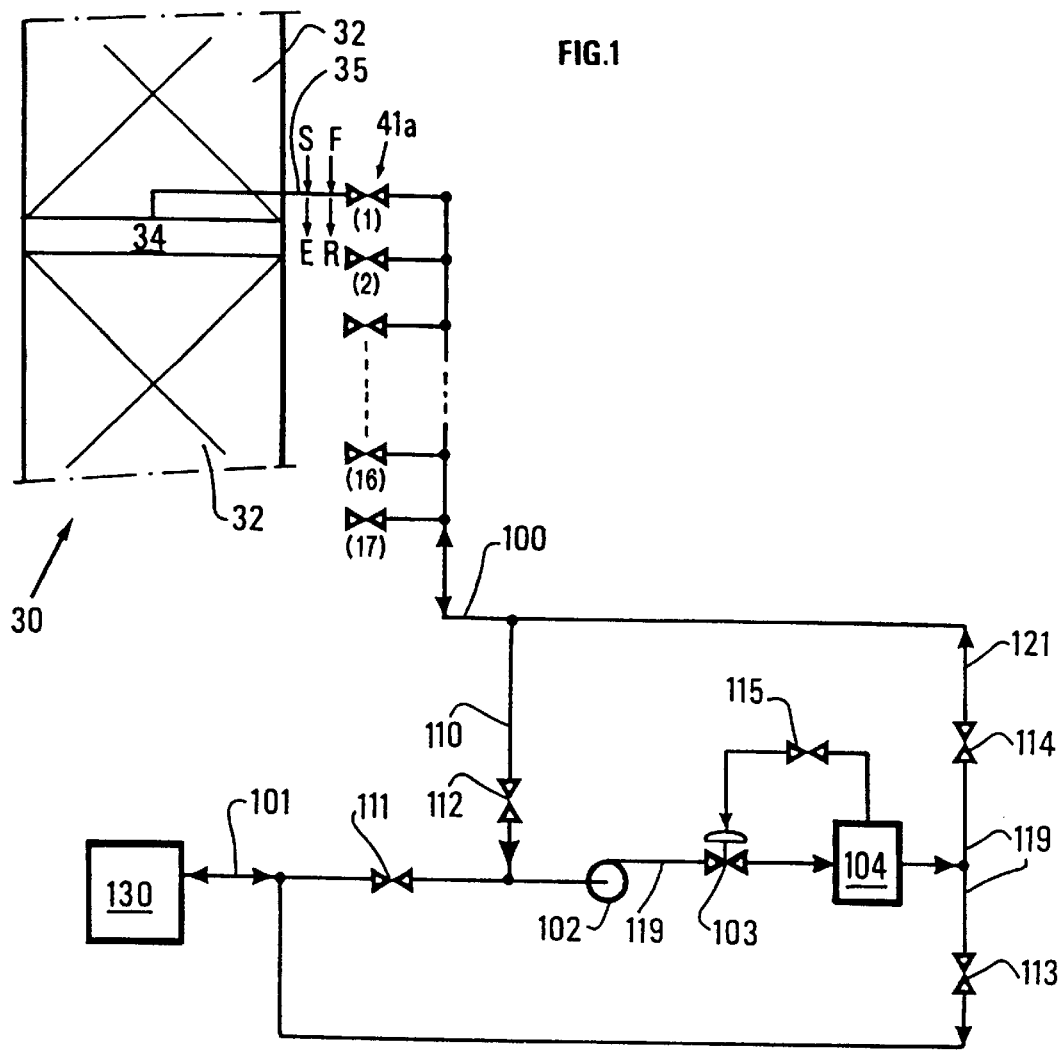
FIG. 1 shows an assembly of means which produce the rinsing apparatus of the invention.

Line 35 is also connected to a circulation line 100 for a rinsing fluid which receives all lines 35 from the assembly of adsorption beds 32. Each line 35 is controlled by a rinsing valve 41a located between the supply or extraction lines and line 100. Rinsing means 42 in line 35 supplied by line 100 directs a jet of fluid to each supply and extraction point. A further valve 40, a block valve, is located in line 35 between the supply or extraction lines and the distributor plate 34 and can isolate a particular bed. All the valves 41a are connected to an open-close control means 50 which can also control the operation of all of the valves of the rinsing apparatus.

For simplification (FIG. 1), rinsing valves 41a (numbered 1 to 17) correspond to the 17 beds of the adsorber. Circulation line 100 is connected via a line 110 via a valve 112 to the inlet of a circulation pump 102 and the delivery of the pump is connected to a line 119 in which a block valve 113 is located, and to a line 101 connected to a fluid reservoir 130. The flow rate at the pump delivery is controlled and monitored by a regulating valve 103 and a flow meter 104.

A block valve 111 connects line 101 and reservoir 130 to the inlet to pump 102, while a further block valve 114 in a line 121 connects line 119 to rinsing fluid circulation line 100.

Using this apparatus, rinsing fluid can be circulated from each bed to reservoir 130 by closing valves 111 and 114 and opening valves 112 and 113 or by circulating fluid from reservoir 130 to one of the adsorber beds by closing valves 113 and 112 and opening valves 111 and 114.

When fluid is not extracted from one of the beds and when it is not injected, valves 111, 112, 113 and 114 are closed and valve 115 is open to allow pump 102 to operate in a closed loop.

In a first implementation of the use of the apparatus corresponding to the first embodiment, when the contents of the line which is common to the four streams are to be drawn out, this operation must be carried out in synchronised fashion with the other operations which are occurring in the adsorption column(s) during the period between two permutations.

As an example, if the slug of feed contained in the "common section" is to be drawn off during the period which just precedes extraction of the extract, the following is carried out:

in period n°1 of the cycle, assuming that extract is extracted from bed n°4 (valve n°5 controlling the outlet from bed n°4 and the inlet to bed n°5). Rinsing valve n°6 is opened, valve n°112 connecting line 100 to the intake of pump 102 is opened, a flow rate of v/T, for example, (where v represents the volume of the common section and T is the permutation period) is imposed by means of regulating valve 103 and flow meter 104, valve 113 is opened so as to deliver the fluid contained in the common section to the intake of the booster pump via line 101. In this way, the slug of feed initially contained in section n°6 is delivered to the booster circuit, while the common section is filled with liquid extracted from zone 2 which could be classified as impure concentrated extract. It should be noted that here, the feed contained in the common section has been extracted at a flow rate of v/T for a time T. The same operation could be carried out in a time T/2 at a flow rate of 2 v/T. During the other portion of the period, pump 102 would continue to circulate the fluid in a closed loop, valves 111, 112, 113 and 114 being closed and valve 115 being open.

During period n°2, the extract is extracted from the outlet from bed n°5 (valve n°6). The common section which has been prepared during the preceding period is thus already full of extract. During period n°2, common section n°7 is prepared using rinsing valve n°7, and so on from period to period.

In the second implementation of the first embodiment, when the slug occupying the common section in the adsorbers is to be delivered, this operation is also carried out as a synchronised operation with the other injections and extractions. As an example, if the slug of extract in the adsorber is to be delivered during the period just following extraction of the extract, the following procedure is carried out:

Assuming again that in period 1 of the cycle, extract is extracted from bed n°4 (valve n°5 controlling the outlet from bed n°4). Line 101 is connected to the solvent circuit, valve 111 is opened to connect line 101 to pump 102, and valves 112 and 113 are closed. A flow rate of $v/t_1$, for example, is imposed for a time $t_1$ where $t_1 \leq T$ (where v represents the volume of the common section) using regulating valve 103 and flow meter 104, valve 114 is opened so as to deliver solvent to line 100, rinsing valve n°4 is opened to flush out the extract contained in the common section with solvent.

During period 4, when the solvent will be injected into the inlet to bed n°4, the common section is initially full of solvent. During period n°2, common section n°5 is prepared by means of rinsing valve n°5 and so on, period by period.

Using this apparatus, it is possible to overcome all of the disadvantages cited above during one and the same period, by using the apparatus of the invention in time sharing mode, for example between each of the four streams.

As an example, from t=0 to T/4, the slug of feed located in the common section of the bed from which extract will be extracted during the following period is drawn off at a rate of 4 v/T. From t=T/4 to T/2, the slug of raffmate located in the common section of the bed into which feed will be injected during the following period is drawn off at a flow rate of 4 v/T. From T/2 to 3T/4, the slug of solvent located in the common section of the bed from which raffinate will be extracted during the following period is drawn off at a flow rate of 4 v/T. From 3T/4 to T, the slug of extract located in the common section of the bed into which solvent will be injected during the following period is drawn off at a flow rate of 4 v/T. On average over the period, slugs of feed, raffinate, extract and solvent are drawn off, each at a flow rate v/T. The disadvantage is that it is not in practice possible to segregate these different slugs from each of the four streams, and the whole of it must be sent to a distillation column via line 101 to separate the solvent and the feed.

Preferably, and in contrast, this same apparatus can be successively used once in injection mode and once in extraction mode by connecting line 101 to one and the same stream to overcome two of the four disadvantages mentioned above.

Thus, from t=0 to T/2 in FIG. 4a, the slug of feed located in the common section of the bed into which feed was injected during the preceding period is flushed out using the extract from extracting the extract injected at a flow rate of 2 v/T. From t=T/2 to T as in FIG. 4b, the slug of extract located in the common section of the bed into which solvent will be injected during the following period is drawn off at a flow rate of 2 v/T and delivered to the extract extraction. In this way, the average flow rate of the extract is constant: during the first halfperiod, the flow rate of the extract sent to the distillation column will be E−2 v/T while during the second half-period, the flow rate will be E+2 v/T.

It is also possible to keep the same flow rates in the four zones as in a system which does not require line rinsing.

In FIG. 4c, to maintain flow rates D1, D2, D3 and D4 in zones 1 to 4, the flow rate of the solvent must be increased and the flow rate of the feed must be reduced by a value v/T, with respect to a system which does not contain a common section, to retain the yield and purity. The loss of productivity due to re-injection of raffinate into zone 3 and the waste of solvent due to extraction of the solvent with the raffinate has not been compensated for.

In order to simultaneously resolve the four disadvantages cited above, two apparatus as described in FIG. 1 must be used simultaneously.

Figure 2:
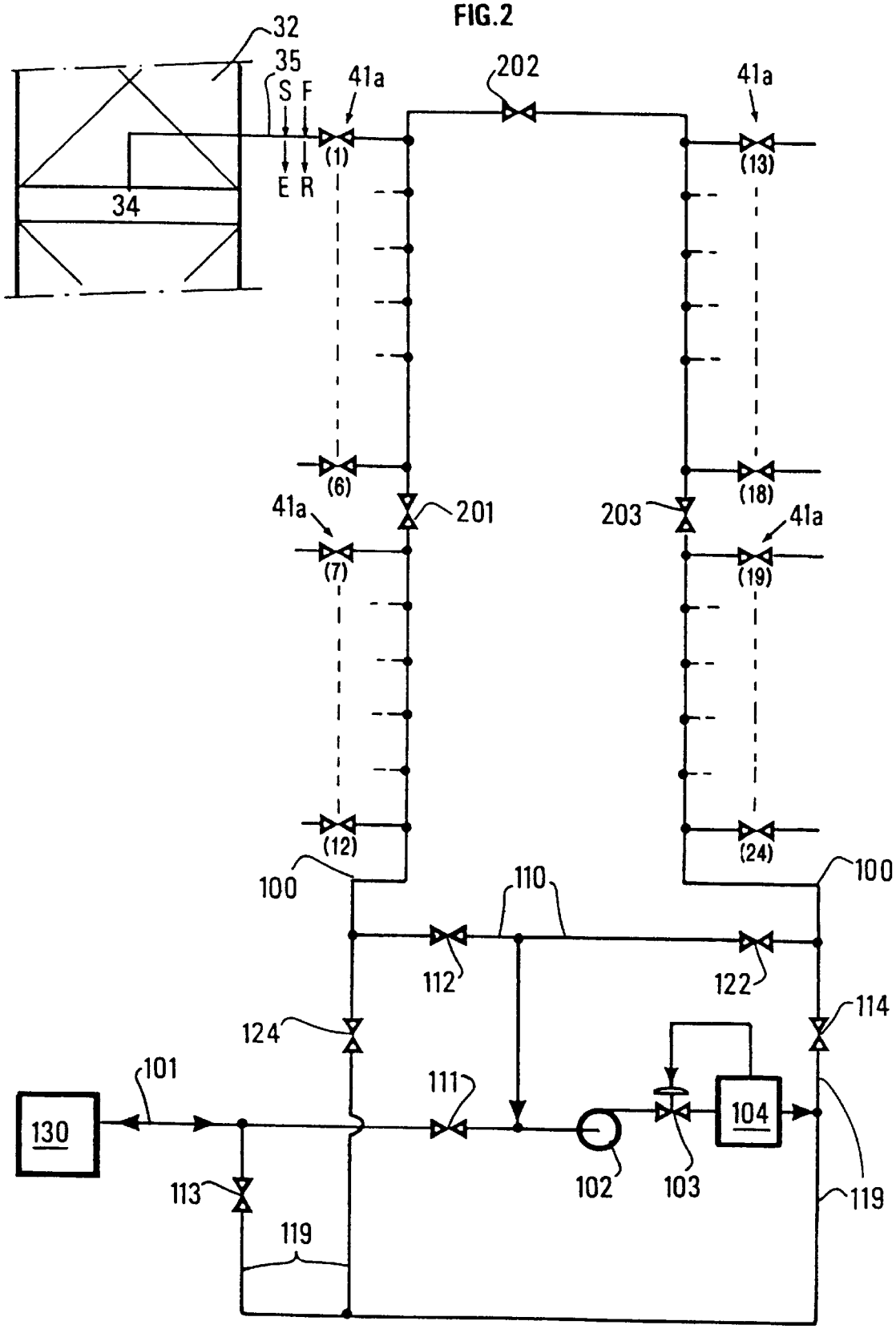
FIG. 2 shows a rinsing apparatus with a circulation line for the rinsing fluid which is in the form of a closed loop.

FIG. 2 represents a preferred embodiment of a rinsing apparatus in accordance with the invention in a simulated moving bed adsorber.

This adsorber comprises the lines and valves of FIGS. 1 and 3 with the same functions. It also comprises twenty four beds, for example, one rinsing valve 41a per bed, numbered 1 to 24, and a connection apparatus in accordance with FIG. 3, for each distributor between two consecutive beds with fluid circulation line 100 in a closed loop.

Block valves in this closed loop, for example three—201, 202 and 203, determine four sections each comprising six rinsing valves 41a.

The apparatus shown in FIG. 2 can draw fluid from any of the four sections and deliver it to one of the other three.

It is also possible to displace the slugs initially contained in two common sections which are different from each other.

This is accomplished by connecting the intake of pump 102 and line 110 to each of the two extremities of line 100: valve 112 (next to the $12^{th}$ valve) and valve 122 (next to the $24^{th}$ valve). Similarly, the delivery from pump 102 and line 119 can be connected to each of the two extremities of line 100: valve 124 (next to the $12^{th}$ valve) and valve 114 (next to the $24^{th}$ valve).

It also becomes possible to carry out the scheme shown in FIG. 4c directly. This has the advantage of not being fixed to certain periods of the cycle, and of changing the recycle flow rate during a period to keep the flow rates in all of the other zones constant.

The operation of the preferred apparatus of the invention to effect the displacement shown in FIG. 4c will now be described in order to facilitate comprehension. In period 1 of the cycle, it is assumed that solvent is injected into bed n°1 and feed is injected into bed n°13, while extract and raffinate are extracted from beds 6 and 18 respectively. During this period, rinsing valve n°2, block valves 202 and 203, and valve 122 are opened to draw off the slug of extract located in the common section of bed 2 by means of pump 102 while controlling the flow rate by means of regulating valve 103 and flow meter 104 and valve 124 and rinsing valve n°12 are opened to flush the slug of feed located in the common section of bed n°12 with extract. Finally, valves 201, 111, 112, 113 and 114 are closed.

It is also possible to use the apparatus successively for two different displacements during the cycle. This overcomes three of the four disadvantages mentioned above and keeps the fluids which are mutually compatible in the loop, such as solvent and diluted extract.

When very high purity is required, it is preferable to rinse the common section with several times its volume to be sure of completely eliminating the impurities. Over-consumption of solvent can be eliminated by adopting the displacement cycles described in FIGS. 5 and 6, for example.

Figure 5A:
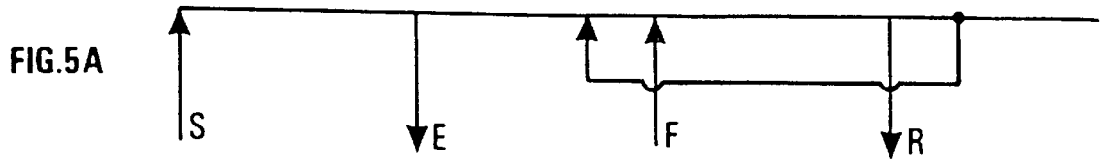

In FIG. 5a: from t=0 to 0.4T (always with reference to period n°1 of the cycle), rinsing valve n°20 and valve 122 are opened. Valves 201, 202 and 203 are closed. Pump 102 and the flow rate control loop allow delivery at a flow rate of 2 v/t to line 100 (valve 124 open, valve 112 closed) and rinsing valve n°12 is open. Thus the solvent contained in the common section at the outlet from bed n°19 is extracted, this solvent is replaced by diluted raffinate. For this reason, care is taken only to displace 0.8 times the volume of the common section to avoid any pollution. The contents of line 100 flush the majority of the slug of feed contained in the common section of bed n°12 towards the adsorber.

Figure 5B:
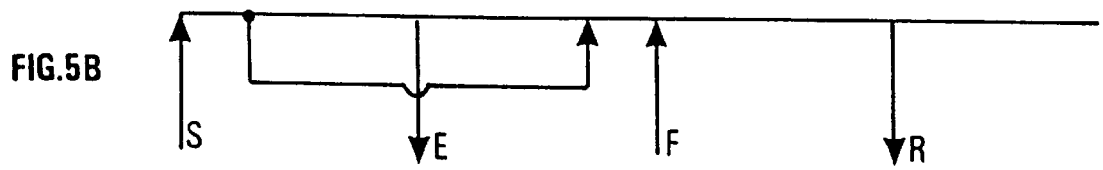

In FIG. 5b: from t=0.4T to 0.6T, the rinsing valve of bed n°2 is opened, valve 201 is closed, valves 202 and 203, also valve 122, are open. Pump 102, control valve 103 and flow meter 104 return the contents at a flow rate of 2 v/T. This thus displaces the slug of feed in the common section of bed n°12 towards the interior of the adsorber. This avoids the return of a very small volume of feed during the end of the period (FIG. 5c) in the immediate proximity of the extract extraction point.

Figure 5C:
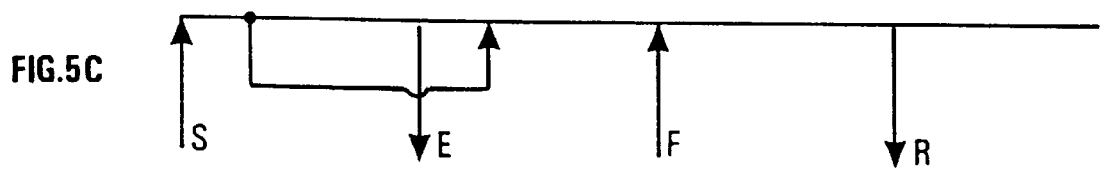

In FIG. 5c: from t=0.6T to T, the rinsing valve of bed n°2 is opened, also block valves 202 and 23 and valve 122. Valve 201 is closed. Pump 102, control valve 103 and flow meter 104 return the contents of line 100 to the rinsing valve of bed n°8 at a flow rate of 2 v/T, via valve 124. This draws off a slug of diluted extract which is replaced by the solvent in the common section of bed n°2, while the contents of line 100 rinse the common section of bed n°8.

The contents of line 100 are thus a mixture of solvent and diluted extract.

Figure 6A:
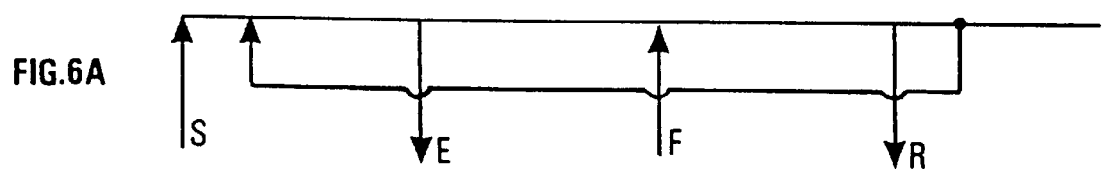

In FIG. 6a: from t=0 to 0.4T, always with reference to period n°1 of the cycle, the rinsing valve of bed n°20 and valve 122 are opened. Pump 102 and the flow rate control loop can deliver to line 100 at a flow rate of 2 v/T (valve 124 open and valve 112 closed). Valve 201 and rinsing valve n°3 are opened. The solvent contained in the common section at the outlet from bed n°19 is thus extracted, and replaced with diluted raffinate. Care is thus taken to displace only 0.8 times the volume of the common section, to avoid any pollution. The contents of line 100 flush the majority of the slug of extract contained in the common section of bed n°3 towards the adsorber.

Figure 6B:
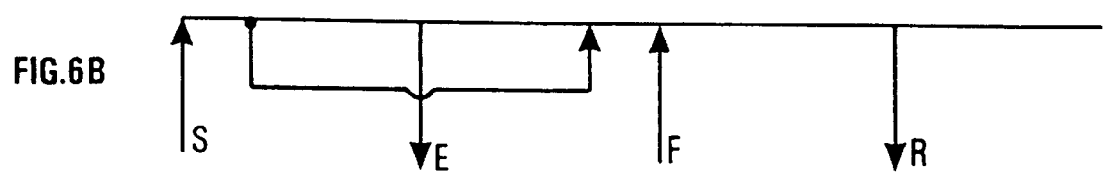

In FIG. 6b, from t=0.4T to T, rinsing valve n°3 remains open. Valves 202 and 203 are opened. Pump 102, regulating valve 103 and flow meter 104 can deliver via valve 112 at a rate of 2 v/T towards line 100. The solvent contained in line 100 flushes the slug of feed contained in the common section of bed n°12. The advantages of this mode of operation are that line 100 thus contains essentially solvent and that each rinsing valve opens and closes only three times per cycle instead of four times in the sequence of operations described for FIGS. 5a, 5b, 5c.

Figure 6C:
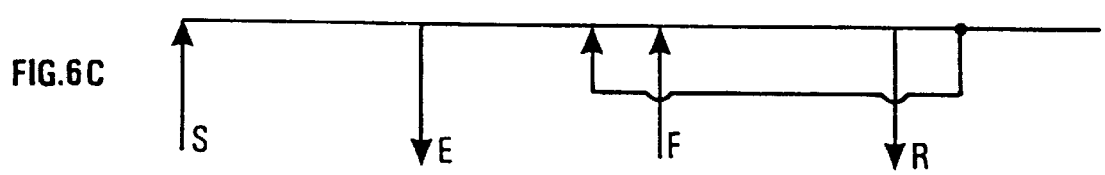
Figure 6D:
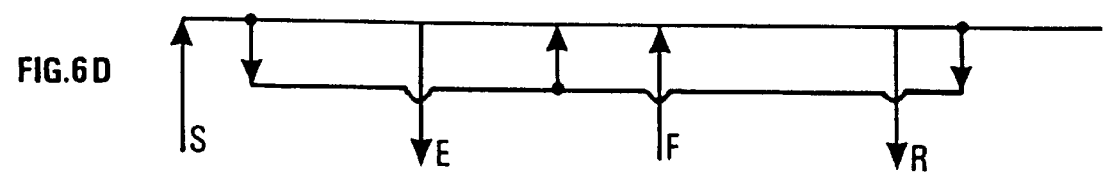

It should also be noted that the sequence of operations of FIGS. 6a and 6b is equivalent neither to that of FIG. 6c since the slug of extract comprised between injection of the solvent and extraction of the extract is recovered, nor to that of FIG. 6d since in this case, as in that of FIGS. 5a, 5b and 5b, the contents of line 100 would be a solvent-extract mixture instead of being essentially solvent.

I claim:

1. A rinsing apparatus in a simulated moving bed feed adsorption unit comprising a plurality of beds (32) of an adsorbent, each being connected by a fluid distribution means (34) comprising a line (35) for distributing fluids to at least one feed inlet (38), at least one desorbent (or solvent) inlet (37), optionally at least one internal reflux inlet, at least one outlet (36) for an extract and at least one outlet (39) for a raffinate, each inlet and outlet comprising an on-off valve (36a, 37a, 38a, 39a), the apparatus being characterized in that each distribution line (35) for each bed comprises at least one rinsing valve (41a), all of the rinsing valves being connected to at least one line (100) for circulating displaced fluid, said line (100) comprising at least one fluid circulation pump (102) and at least one means (103,104) for controlling the flow rate of the fluid delivered by the pump, each of the rinsing valves (41a) being connected to a means for controlling the opening or closing of said valves, the apparatus being further characterized by the line (100) being a closed loop, with each of the rinsing valves being connected to said loop, the loop having at least one on-off block valve (201) defining at least two sections, two on-off valves (112, 114 and 122, 124) at each of the extremities of the loop for connecting each extremity to either the intake or delivery of the circulation pump, and control means for activating the block valve and the on-off valves of each extremity of the loop to orient the circulation of the fluid extracted from a section and that of the delivered fluid to another section of the loop in one direction or in another direction.

2. An apparatus according to claim 1, in which the circulation pump draws off the fluid contained in at least one common section located between the fluid distribution means, the on-off valves and the rinsing valve and the circulation pump being related to a given bed, and delivering said fluid to an external collector.

3. An apparatus according to claim 1, in which the circulation pump draws the fluid from an external collector and delivers the fluid to a particular adsorbent bed.

4. An apparatus according to claim 1, in which the closed circulation loop comprises n block valves (201, 202, 203) defining n+1 sections.

5. An apparatus according to claim 1, in which an external fluid line (101) is connected either to the intake of the pump via a valve (111) or to the delivery of the pump via a valve (113).

* * * * *